United States Patent [19]

Van Wilson et al.

[11] 4,205,462

[45] Jun. 3, 1980

[54] SCHEME TRAINING APPARATUS FOR TEACHING MAIL SORTING AND THE LIKE

[75] Inventors: Marlin Van Wilson, Barboursville; John R. Ward, Stanardsville, both of Va.; Lawrence C. Nickell, Fairlea, W. Va.

[73] Assignee: Training Associates, Inc., Ronceverte, W. Va.

[21] Appl. No.: 910,512

[22] Filed: May 30, 1978

[51] Int. Cl.² .............................................. G09B 25/00
[52] U.S. Cl. .......................................... 35/8 R; 35/9 R
[58] Field of Search ................... 35/6, 8 R, 9 R, 9 A, 35/9 B, 10, 13, 22 R, 48 R

[56] References Cited

U.S. PATENT DOCUMENTS

| | | | |
|---|---|---|---|
| 3,100,351 | 8/1963 | Priednieks et al. | 35/6 |
| 3,171,114 | 2/1965 | Butler et al. | 35/8 R X |
| 3,254,431 | 6/1966 | Baker | 35/9 A |
| 3,395,464 | 8/1968 | Leslie et al. | 35/9 A |
| 3,477,142 | 11/1969 | Cornell et al. | 35/9 A |
| 3,528,181 | 9/1970 | Arbon et al. | 35/9 A |
| 3,698,100 | 10/1972 | Frank | 35/9 A |
| 3,751,825 | 8/1973 | Barrett | 35/6 |
| 3,894,346 | 7/1975 | Ward et al. | 35/8 R |

*Primary Examiner*—Vance Y. Hum

*Attorney, Agent, or Firm*—Mason, Fenwick & Lawrence

[57] ABSTRACT

Scheme and knowledge trainer apparatus for teaching trainees sortation scheme and knowledge items and skill for sorting such as mail sorting and the like, comprising an electronic sortation training console having a switch panel depicting plural horizontal rows and vertical columns of sort blocks symbolizing discrete sort locations each having a touch sensing switch and changeable indicia strips for providing the sort blocks with legends denoting sort location titles therefor. A visual projector is provided for receiving a training film having frames for successively displaying lesson information on a viewing screen depicting sort location legends correlated with the legends on the console blocks and having apparatus for producing correct location signals denoting the correct console sort block location for the displayed legends. Electronic circuits are coupled to the switches and respond to activation of the switches and to the correct location signals for sensing correct and error sorts upon activation of the touch sensing switches and providing continuous counts thereof on correct and incorrect readout counters. Light indication of the correct sort block may be produced responsive to each activation of a switch at a wrong sort location.

20 Claims, 8 Drawing Figures

SCHEME TRAINING APPARATUS FOR TEACHING MAIL SORTING AND THE LIKE

BACKGROUND OF THE INVENTION

The present invention relates in general to a scheme and knowledge training system and apparatus to facilitate teaching or training of students to perform certain functions, such as sorting of items in accordance with a predetermined scheme or format and more particularly to a system and apparatus involving audio-visual devices and touch or proximity sensing switching arrays designed to rapidly teach scheme functions such as mail or product sorting and similar distribution skills.

Heretofore, trainees attempting to learn knowledge items such as are required for mail sorting or sorting of other items in accordance with a predetermined scheme have usually had to rely upon a slow process of acquiring small bits of knowledge or skill over an extended period of practice time by use of dummy cards and a practice sorting case or bin structure, or by actually sorting live mail or dummy cards to practice the knowledge and skill of sorting over a long period of time by a slow learning process. Extensive reading, home study and work at a simulated sortation position permits one to acquire improved sorting skills, but with a very slow process. No means of providing automated audio-visual scheme training systems to provide trainees with a sorting learning experience which would rapidly teach the necessary knowledge items and training skills has been provided, to our knowledge.

The present invention involves a simulated electronic sortation console and an audio-visual projector system, interrelated with each other to provide certain predetermined training and testing modes of use in connection with a structured series of program lessons designed to rapidly teach trainees to acquire sortation knowledge and sufficient sortation skill to rapidly reach the standards of qualifications necessary for live mail sorting employment and the like. This knowledge can be employed in mail sortation by manual or machine methods. The system is designed to greatly reduce training time, offers superior training to lead to more highly skilled employees capable of greater sorting accuracy, while providing considerable program flexibility to permit change and scheme updating and the like. A factor of accuracy reinforcement is present in the system by circuitry which, in the training mode, prevents the trainee from advancing from one sort to the next unless the previous letter or item to be sorted was sorted at the correct position, thereby preventing the learner from having to relearn sorting knowledge or skill which involved mis-sorts which the trainee thought was correct, but were in fact erroneous. The system also includes means providing a testing mode, wherein a supervisor may condition the system to have the trainee go through a lesson and counting devices record and indicate the number of correct sorts and incorrect sorts made.

More particularly, the system of the present invention includes an electronic sortation console which gives the appearance of a scheme base, to simulate a mail sorting case having a large number of pigeon holes into which letters or mail are to be sorted, providing a gridwork of sort locations having means for displaying changeable indicia indicating addresses or the like and adjacent switches at each of the sort positions adjacent the associated indicia, to respond to touch contact or proximity of the finger. An audio-visual projector is designed to provide a visual image of mail, maps, addresses or whatever stimulus is needed for the specific training requirements of the trainee, and the trainee is intended to activate the correctly located sort switch adjacent the indicia on the sortation console corresponding to the visual information provided on the projector screen. Electrical connections between the projector and the console are such that if the trainee activates the correctly located sort switch, a new visual image of an address or the like will automatically appear on the projector screen, but if the sort is in error, a warning signal will appear indicating to the trainee where the correctly located sort should have occurred, and the trainee must correct the input by contacting the correct sort switch before proceeding to the next image on the projector screen. Correctly located sorts and incorrect sorts are continuously being recorded on counters providing a continual indication of the number of correct and incorrect sorts which have been made during performing of the lesson. The learner sees one address or piece of mail at a time on the visual screen jet as if the learner were holding a stack of mail, and the learner is prevented from unknowingly making mis-sorts or incorrect sorts because of the warning signal feature which appears when a mis-sort is made and because the letter image on the visual screen is held on the screen until the correct response is made. Thus, only correct answers or sorts advance the training program displayed on the projector screen.

By the present system, the trainee's memory learning process is first aided by introducing material in small bits and allowing the trainee to respond. Only correct responses allow the trainee to advance the program. The student never learns incorrectly. As the trainee responds to a projected address or information displayed on the visual screen, only the correct sortation will permit the program to advance. Additionally, the trainee is immediately shown the correct response, providing positive reinforcement, by a warning signal in the form of light appearing at the correct sort position.

An object of the present invention, therefore, is the provision of a novel scheme and knowledge trainer system and apparatus designed to facilitate highly skilled scheme and knowledge training in accordance with sortation schemes, such as mail sorting, and the like, wherein the material is displayed on a visual screen of an audio-visual projector and an electronic sortation console having replaceable indicia such as addresses, maps, names of locations, or similar information, is activated by the trainee touching a position on the console, activating a switch which is identified by electronic circuitry as either the correct or the incorrect sort position for the information on the projector screen, and wherein device maintains a readout count of correct and incorrect sorts by the trainee.

Another object of the present invention is the provision of a novel scheme and knowledge training system and apparatus as defined in the immediately preceding paragraph, wherein the system may be conditioned to effect automatic advancing of the program or lesson information on the visual screen if the correct sort location is touched by the trainee and which provides a visible warning signal indicating where the correct sort location is in the event an incorrect sort location is touched, and wherein the lesson information does not advance to the next item until the correct sort location is touched.

Other objects, advantages and capabilities of the present invention will become apparent from the following detailed description, taken in conjunction with the accompanying drawings illustrating a preferred embodiment of the invention.

DETAILED DESCRIPTION OF A PREFERRED EMBODIMENT

Referring to the drawings, wherein like reference characters designate corresponding parts throughout the several figures, there is shown an embodiment of the scheme and knowledge training system and apparatus of the present invention designed for mail sorting training to rapidly train persons to become skilled at sorting mail and achieving greater sorting accuracy. The apparatus of the present invention as indicated somewhat diagrammatically in FIG. 1 comprises a sortation console unit, indicated generally by the referenced character 10, having a front panel arranged in a manner roughly simulating the arrangement of sorting cubicals or bins in a mail sorting case, typically arranged in horizontal rows and vertical columns of cubicals or bins, by providing a checkerboard pattern of squares on the front panel 11 of the sortation console and designed to carry changeable legends indicating addresses, postal zones, post office locations, cities, or whatever lesson information is desired and additionally having touch-sensitive switch means adjacent the legend to be touched by the trainee simulating the action of placing a piece of mail in a mail sorting case cubical.

Figure 1:
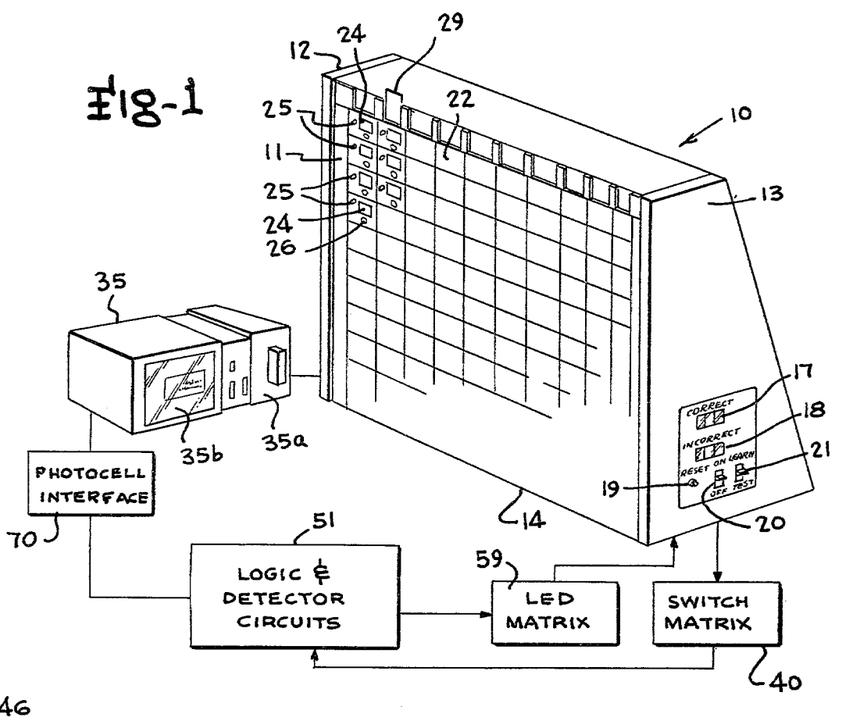
FIG. 1 is a somewhat diagrammatic illustration of the main components of the scheme training system and apparatus of the present invention, with the sortation console illustrated in perspective view.

More specifically, the sortation console unit 10 of the preferred embodiment is in the form of a console structure providing a front face or panel 11 of relatively large size, for example, about 24 inches high by 26 inches wide, supported between two end wall members 12,13 which in the illustrated example are of truncated right triangular shape providing vertical front edges and rearwardly and downwardly inclined rear edges. The side walls 12,13 are fixed to bottom wall 14 and a top cross brace to form a rigid housing structure closed in front and at the bottom and sides and defining a rearwardly opening space to house the electronics and printed circuit boards and supporting structure to be associated with the sortation console unit, which is covered by a removable sheet metal rear cover panel. One of the side walls, for example, side wall 12, has an opening backed up by a panel containing readout counters, 17 and 18, for example, formed of light emitting diode numeric readout blocks to provide readout counts of the number of correct sorts and error or incorrect sorts made by the trainee in performing the lesson or training program. Adjacent and below the readout counters 17 and 18 and also accessible through the opening 16 is a reset switch 19, a main power slide switch 20, and a training/test mode switch 21 for placing the unit in either a training mode or in a testing mode, as later described.

Figure 2:
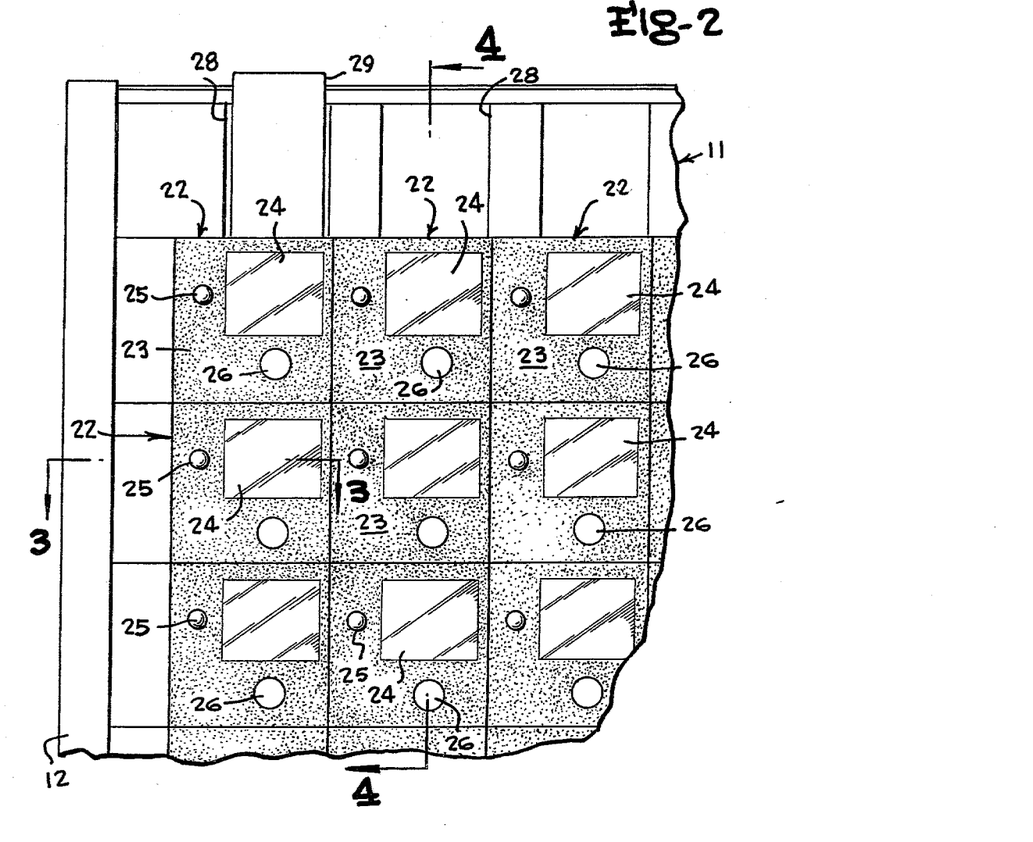
FIG. 2 is a fragmentary front elevation view of the front of the console.

The front panel 11 is lined to provide a checkerboard pattern of squares, best seen in FIG. 2, one of which is indicated by the reference character 22, which in one example is of light brown color over a portion of its area indicated at 23 arranged to provide a transparent or white rectangular window 24 in the upper right hand corner portion and extending over a substantial part of the square through which indicia such as addresses, postal zones, names, or other information may be viewed, and provided with a light emitting diode 25 to the left of the window 24 and a white circle indicating a touch zone 26 below the window 24 immediately behind which is a touch switch 27, for example, a touch switch capsule in the configuration of a thin cylindrical wafer of the type designated as model TC-1/C made by Refac Electronics Corp. of Barkhamsted, Connecticut.

Figure 3:
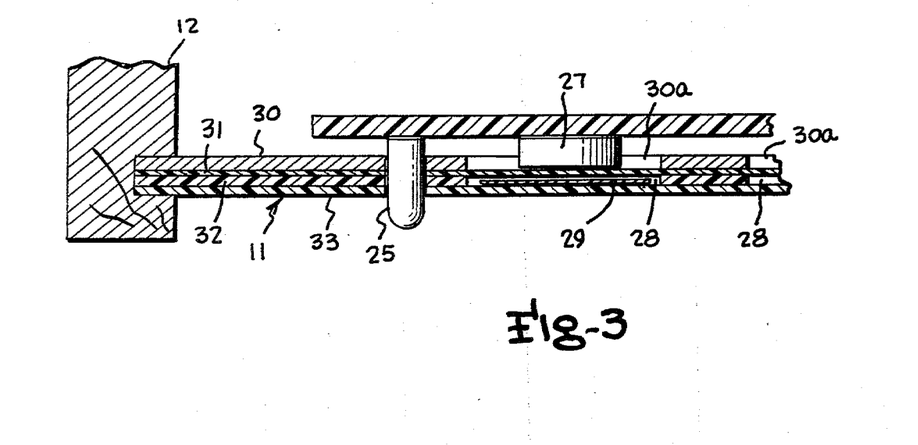
FIG. 3 is a horizontal section view, to enlarged scale, through a portion of the front panel of the console, taken along the line 3—3 of FIG. 2, but to a larger scale.
Figure 4:
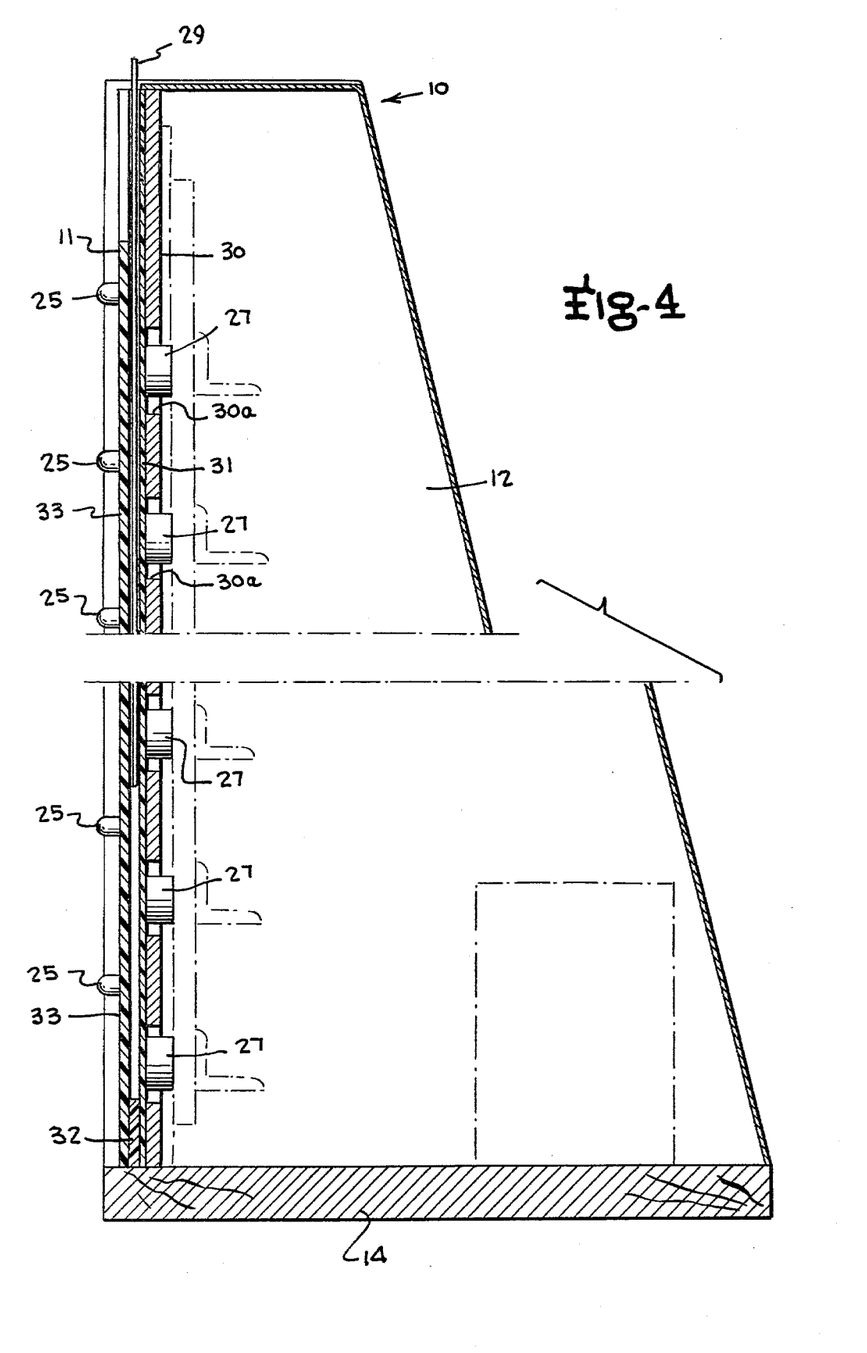
FIG. 4 is a vertical section view through the front panel of the console, taken along the line 4—4 of FIG. 3.

As is more clearly shown in FIG. 3, the front panel 11 is made up of a plurality of layers of material arranged to provide upwardly opening, vertically elongated strip receiving slots to receive legend bearing tapes or strips 29, for example, of plasticized laminated paper or the like, having printed legends on them such as addresses, names, postal zones, post office names, and like indicia designed to be located behind and be visible through the viewing windows 24 of the square 22 in the associated vertical row of squares. Specifically, the front panel comprises a rear aluminum backing panel 30, for example, made of Alodyned aluminum, which spans the total width and height of the front panel area, and has round holes 30a, for example, about 1″ in diameter for the touch switch zones 26, with a white vinyl sheet 31, for example, of about 0.010 inch white vinyl, covering the front face of the aluminum backing sheet 30. Strips of 0.020 inch thick white vinyl sheet material 32 extend the height of the front panel at the opposite vertical edges of the front panel and at locations near the left side of each square 22, as viewed in FIG. 2, in the zone occupied by the light emitting iodes 25 in each vertical row of squares, to provide the slots 28 for receiving the legend bearing strips or tapes 29, and this layer of laterally spaced vinyl spacer strips 32 is covered forwardly by a clear vinyl silk screen 33, for example, 0.020 inch thick clear vinyl, having the lines defining the boundaries of the squares 22 and the brown tinted areas in each square, and being clear in the window zone 24 of each square, to complete the front panel assembly. Appropriately sized holes are provided through the assembly of layers 30-33 to receive the light emitting diodes 25 and permit them to project forwardly of the front surface of the front panel 11.

Within the sortation console, may be arranged a plurality of printed circuit boards mounted immediately rearwardly of the front panel assembly 11 to provide a matrix for connection to and support of the light emitting diodes and for connection to and support of the touch switch capsules 27 with their front faces located in the holes 30a of the aluminum backing sheet 30 and bearing against the vinyl sheet 31. The assembly of vinyl sheets making up the front panel 11 are capable of being flexed rearwardly sufficiently responsive to touch of the trainee in the zones where the touch switch capsules are located to effect activation of the touch switch capsules. These touch switch capsules are also connected between horizontal and vertical conductors of the switch matrix formed on the printed circuit panels mounted immediately behind the front panel 11 to provide the switch matrix indicated in FIGS. 5 and 6.

The trainee is given the sorting instructions in the form of addresses, letter images, postal zones, or the like, by an audio-visual projector 35, which may be, for example, an Audiscan Model 3100 audio-visual projector manufactured by Audiscan Products Corp. of Belleview, Washington, which has a section 35a for receiving a program cartridge, in the form of a film cassette of the addresses for information to be viewed by the trainee and certain marginal coded information, as later described, and which has a viewing screen 35b on which is projected a visual image of the letter, address, or the like, for sortation related to the addresses or other legends on the tapes or strips 29 for the particular lesson, which have been inserted in the slots 28 of the sortation console front panel 11. Instructions may be given to the trainee by audio information, as well as display information on the screen, to reinforce the learning process. The marginal code material on the film, which would be invisible to the trainee, contains information which is to be read by photocells incorporated in the audio-visual projector to provide electrical signals indicating the location of the correct sortation response of the trainee. The system is arranged so that a letter, address, or the like, is projected on the viewing screen 35 and read by the trainee, and the trainee touches the square on the sortation front panel 11 which he responds to as the correct sort square for the image projected on the screen, as determined by the legends visible through the windows 24 of the squares 22. If the trainee activates the correct touch switch capsule or pad 27, an advance signal is generated for the projector by the electronics to be later described, and the correct sort counter 17 advances one count. If the unit is in the training mode, as distinguished from the testing mode, an incorrect response to the visual image on the screen, produced by touching the touch switch capsule associated with a square 22 not corresponding to the projected image, constitutes an incorrect response which triggers an error detection circuit, providing a visual signal to the trainee by illuminating the light emitting diode 25 for the correct square, and the visual image on the screen is maintained in a hold position until the correct response is made by touching the proper square 22 for the image on the projector screen. Touching the incorrect square also activates the readout counter 18 for error counts to advance one count. In this manner, only correct or corrected responses by the trainee permit the projector to advance one position to the next letter or sorting display, so that the trainee is not allowed to incorrectly learn sorting by proceeding with incorrect sorts without being aware that they are incorrect. If the trainee selects the wrong square or letter cubical position, the sort image of the letter remains on the screen of the projector without advancing until the correct square is contacted and the trainee is immediately informed of the location of the correct square by lighting of the light emitting diode 25 for the proper square.

Figure 5:
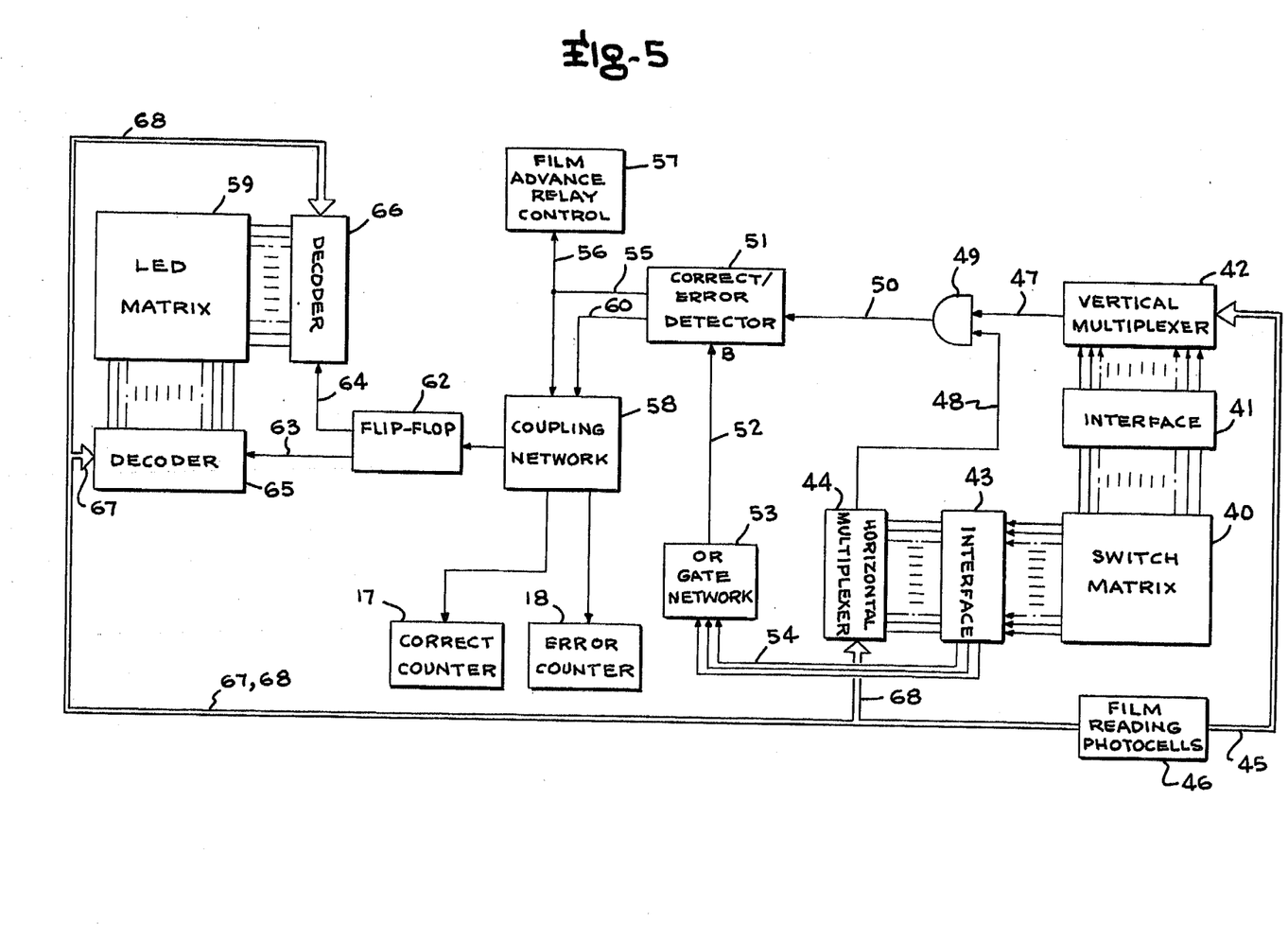
FIG. 5 is a block diagram of the electronic circuitry of the scheme trainer system.
Figure 6A:
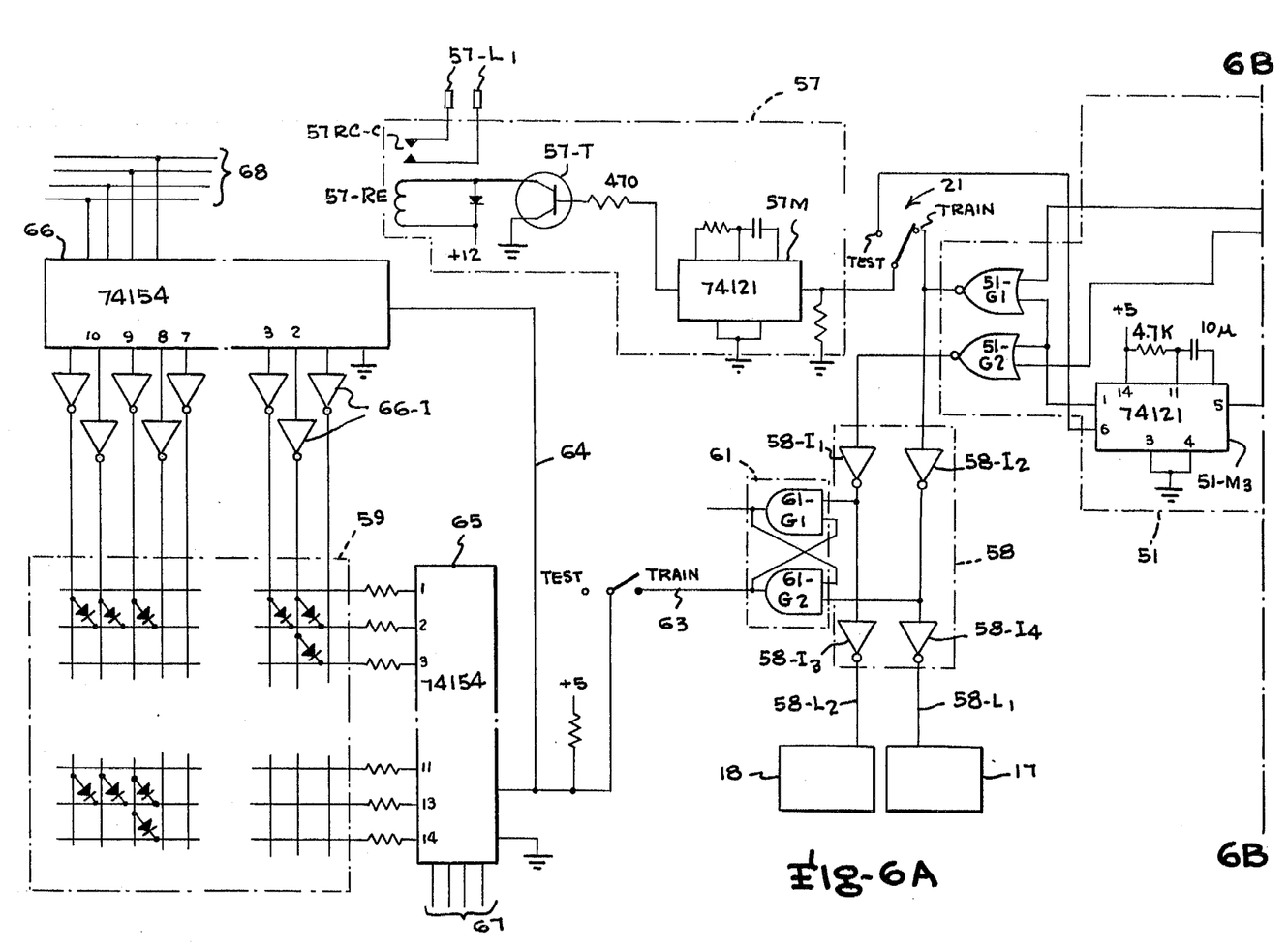
FIGS. 6a and 6b selectively are a schematic diagram of the circuitry associated with the console unit.
Figure 6B:
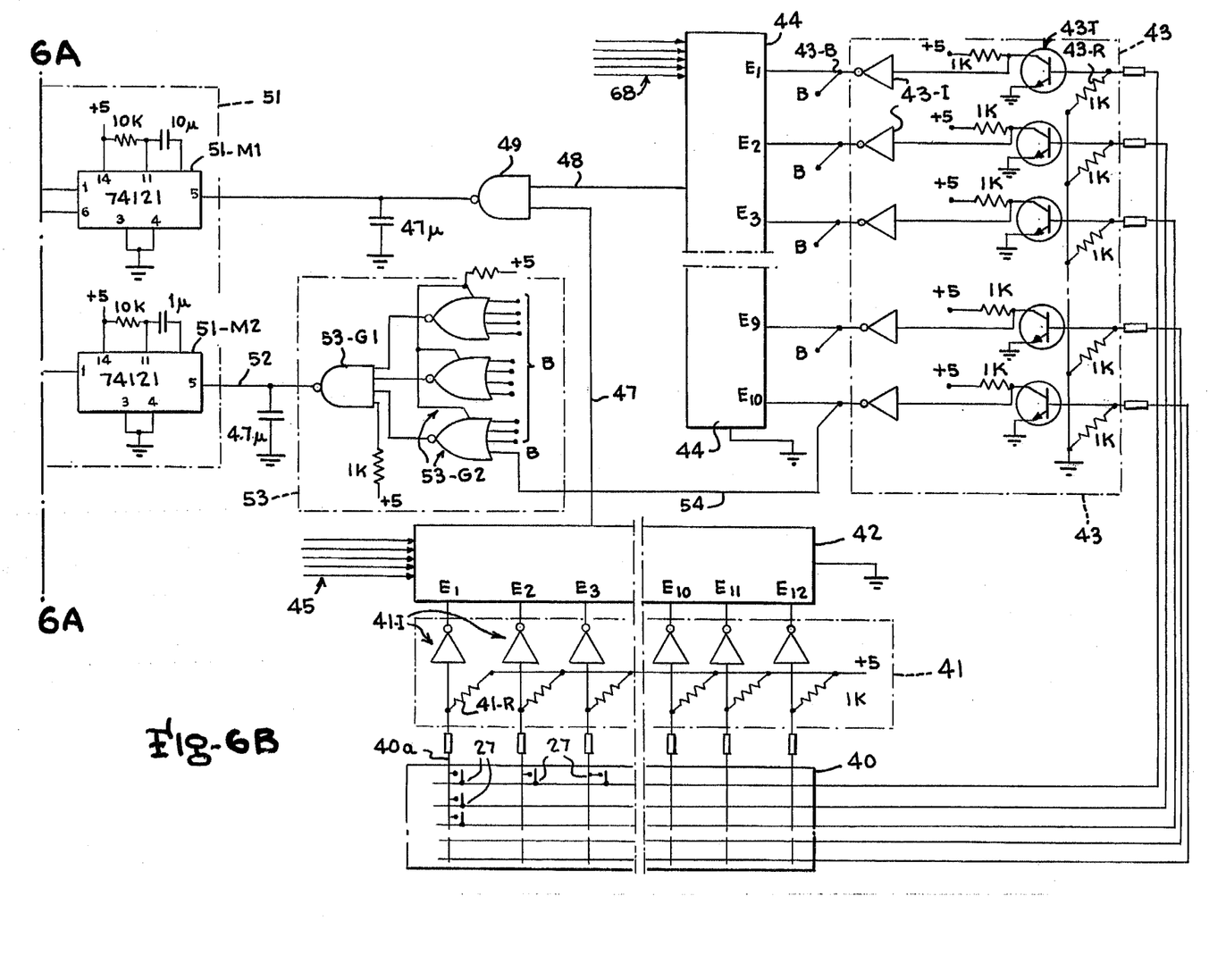

The electronic circuitry for controlling and interrelating the functions of the console and projector components of the system and the coded information on the border of the training film is shown in block diagram form in FIG. 5, and the principal electronics of the system is shown schematically in FIG. 6. Referring to the block diagram of FIG. 5, it will be seen that the system includes a switch matrix 40, which is a grid matrix on one or more printed circuit boards in the illustrated example having conventional connections between the touch switch pads or capsules 27 and the horizontal and vertical conductors of the matrix near the cross-over points of the matrix to connect one horizontal matrix conductor with one vertical matrix conductor, for each switch, in accordance with conventional practice. The vertical conductor outputs from the switch matrix 40 are connected through an interface 41 to a vertical multiplexer 42 and the horizontal matrix conductors are connected through interface 43 to a horizontal multiplexer 44. The vertical multiplexer 42 also receives on the address lines 45 signals from the film reading photocells 46 in the projector 35, later described, which read a light bar pattern on the margin of the film alongside the frame being displayed providing a properly coded readout of the proper sort position on the switch matrix (and console panel 11) for the address or legend being displayed on the projector screen.

Leads 47 and 48 from the vertical multiplexer 42 and horizontal multiplexer 44 respectively are the two inputs to NAND gate 49 having its output connected by lead 50 to error detector 51. An output is provided on lead 47 if the touch switch 27 of the console panel which is pushed or touched by trainee is in the correct vertical column of the matrix 40 (for the light bar code pattern of the film frame being displayed) and an output occurs on lead 48 if the activated touch switch is in the correct horizontal row of the matrix 40. There is no output on lead 47 if the activated touch switch 27 is in the wrong vertical column, and no output on lead 48 if the switch is in the wrong horizontal row. Outputs on both leads 47 and 48, indicating the correct touch switch 27 was activated, causes NAND gate 49 to provide a logic 1 output to the error detector 51. Correct/error detector 51 also receives signals on output lead 52 from a multiple input positive OR gate network 53 connected by leads 54 to the interface 43, thus providing a signal indicating that a touch switch 27 has been activated, whether or not it is in the correct location.

Correct/error detector 51 has a first output 55 which connects by branch 56 to the input of film advance relay control 57 to activate the projector 35 to advance the film cassette to display the next film frame when the correct touch switch 27 has been activated for the preceding frame. This output 55 also connects to a coupling network 58 for supplying signals to the correct readout counter 17 and the error counter 18, and to a matrix 59 for the LED's 25 on the console panel to illuminate the correct LED 25 when a wrong touch switch 27 is activated. Output 60 from the correct/error detector 51 to the coupling network 58 provides signals causing the error counter 18 to advance.

As shown in FIG. 5, the upper output lead 61 applies signals from the correct/error detector 51 and coupling network 58 to a flip-flop 62 having two outputs 63 and 64 to a vertical decoder 65 and horizontal decoder 66 respectively, supplying voltages on the vertical conductors and horizontal conductors of the LED matrix 59. These decoders 65,66 are also supplied by address lines 67,68 from the film light bar reading photocells 46 to cause the proper pair of vertical and horizontal conductors of the LED matrix 59 to be supplied with voltages illuminating the LED 25 for the correct square 22 on the training console panel 11.

Referring now to FIGS. 6A and 6B, which collectively constitute a schematic diagram of the electronic circuitry shown in block diagram form in FIG. 5, it will be seen that the switch matrix 40 has its vertical conductors, one of which is indicated at 40a connected through the interface 41 to the vertical multiplexer 42. The interface 41 comprises a bank of inverters 41-I connected between terminals for the respective vertical conductors of the switch matrix 40 and the entries, such as E1,E2, etc. of the multiplexer 42, which may be a Texas Instruments 74150 multiplexer. The leads of the interface between the inverters and the connections to the vertical conductors of the switch matrix are each connected by a resistor 41R to a positive voltage source, for example at +5 volts DC, thus normally holding the input of the associated interface inverter at about +5 volts unless the associated vertical conductor of the switch matrix 40 has been connected to one of the horizontal conductors of the matrix by closing of one of the touch switches 27. When one of the touch switches 27 of the associated vertical conductor of the switch matrix, for example conductor 40a, is closed connecting that conductor to one of the horizontal conductors, the input of the inverter 41-I, for that conductor goes almost to ground. Address information for the vertical multiplexer 42 is supplied along the address lines, indicated generally at 45, providing signals from the film reading photocells 46, and the vertical multiplexer 42 is thus addressed so as to provide an output on the lead 47 to the NAND gate 49 if one of the push switches 27 associated with the switch matrix vertical conductor 40a (indicated as the correct vertical conductor by the address signals) has been pushed or activated and the touch switches for the other vertical conductors of the matrix have not been activated.

Similarly, the horizontal conductors of the switch matrix 40 are connected by conductors to the horizontal interface 43, including a transistor 43-T and an inverter 43-I for each horizontal conductor of the switch matrix and connect to the horizontal multiplexer entries 44-E1, 44-E2, etc. As shown, the base of each of the transistors 43-T, each of which may be a 2N4424, is connected through a 1K resistor 43-R to electrical ground, and the collector of each transistor 43-T is connected through a resistor to +5 volts and also to the input of a respective one of the inverter 43-I, so that the input of the inverter (which may be TI7404's) is normally held at about 5 volts and goes to near zero volts when a touch switch of the switch matrix 40 connected to the horizontal matrix conductor, for example conductor 40b, associated with that particular interface transistor and inverter has been closed. The horizontal multiplexer 44 is supplied with address lines 68 from the film reading photocells to address the multiplexer 44 properly in accordance with the light bar code on the film frame being displayed to indicate the correct horizontal switch matrix conductor which should have been activated by the touch switch pushed by the trainee. Therefore, if the correct horizontal conductor coordinate for the proper sort location has been conditioned by activation of a touch switch 27 for that horizontal conductor, the output lead 48 from the multiplexer 44 will go low during closure of the touch switch so that the NAND gate 49 will be provided with low inputs on both leads 47 and 48 and provide a high output on its output lead 50 indicating a correct activation of one of the switches of the switch matrix. This high output on the lead 50 from NAND gate 40 provides a correct input to a one-shot multivibrator 51-M1 of the correct/error detector 51, which has resistors and capacitors, such as a 10K resistor and a 47 µf capacitor, connected across pins 14, 11 and 10 as shown to determine the pulse width and provide a negative going pulse going from +5 to about zero volts on lead 51-L1 and a positive going pulse going from about zero to about +5 volts on output lead 51-L2, connected to pins 1 and 6 respectively of 51-M1, each pulse having a duration of about 200 milliseconds. These leads 51-L1 and 51-L2 provide one of the inputs for the two NOR gates 51-G1 and 51-G2 respectively of the correct/error detector, the gate 51-G1 being the correct indicating gate, and the gate 51-G2 being the error indicating gate.

Connections are also provided from the terminals 43-B of the interface 43 along leads 54 to OR gate network 53, which as shown in the schematic diagram is formed from a NAND gate 53-G1 and a set of NOR gates 53-G2 connected so that the output from one of the set of gates 53-G2 goes low or to logic zero if the input to any of this set of NOR gates 53-G2 goes high and thus provide a high output on lead 52 from the NAND gate 53-G1 is any touch switch 27 of the switch matrix is closed by the trainee, regardless of whether or not it was in the correct sort location. Thus the output from the OR gate network unit 53 provides a high or logic one output when someone has pushed one of the touch switches, regardless of whether it was in the correct location. This output lead 52 from the OR gate network 53 is applied to a one-shot multivibrator 51-M2 of the correct/error detector 51, connected as shown to provide a 25 millisecond negative going pulse from about +5 volts to about zero volts on the lead 51-L3 connected from 51-M1 to another one-shot multivibrator 51-M3. The multivibrator 51-M3 is activated by trailing edge of this pulse on 51-L3 to provide a negative going 50 millisecond pulse from about 5 volts to zero volts on the lead 51-L4 providing the other input for each of the NOR gates 51-G1 and 51-G2, and to provide a 50 millisecond positive going pulse from about zero volts to about 5 volts on another output lead 51-L5 going to the test contact member of the training/test mode switch 21.

The output from the correct count indicating gate 51-G2 of the correct/error detector 51 is connected through lead 55 to the coupling network 58 made up of inverters 58-I1 through 58-I4, formed of, for example, Texas Instruments 7404 inverters, providing outputs 58-L1 and 58-L2 to the correct indicating readout counter 17 and the error indicating readout counter 18, and leads 58-L3 and 58-L4 from this coupling network are connected to cross-connected NAND gates 62-G1 and 62-G2 forming the flip-flop circuit 62 to cause the output lead 63 to go from logic one or high of about 5 volts to logic zero when an error is indicated by the NAND gate 51-G2 and supply an enable signal to the error entry of decoders 65 and 66.

The output lead 55 of correct indicating NOR gate 51-G1 is also connected through the training mode switch 21 as indicated, to the one-shot multivibrator 57-M of the film advance relay control circuit 57, which is a one-shot multivibrator arranged to provide a positive going output pulse from zero to about 5 volts of about 200 milliseconds when a correct sort has been made, applied to the base of the transistor 57-T whose collector connects to one side of the coil of the film advance relay 57-RE, connected at its other end to a suitable supply such as a 12 volt source. The contacts 57-RE-C of the relay are closed upon energizing of the relay, when the transistor 57-T conducts responsive to the correct indicating NOR gate 51-C1 going high and the pulse thus generated by the one-shot multivibrator 57-M, and the contacts 57-RE-C are connected by leads 57-L1 to a film advancing solenoid or relay in the projector to advance the training film to the next frame. It will be noted that when the training mode contacts of the training/test mode switch 21 are open and the test mode contacts are closed, the connection from the output of the correct indicating NOR gate 51-G1 to the multivibrator 57-M is broken, and the input to multivibrator 57-M is connected to the lead 51-L5 of multivibrator 51-M3 in the correct/error detector circuit, causing the film to be advanced each time any touch switch is activated, thus placing the unit in the test mode wherein the film is advanced to the next frame each time the trainee touches a touch switch on the training console front panel regardless of whether he makes a correct sort or an error sort. The one-shot multivibrator 57-M and the one-shot multivibrators 51-M1, 51-M2 and 51-M3 may all be Texas Instruments 74121 multivibrators.

The vertical decoder 65 is supplied with address lines 67 from the film reading photocells 46, and is connected through resistors to the vertical conductors of the LED matrix 59 connected to the LED indicators 25 on the front panel of the console 10 and is enabled by the lead 63 going low to supply voltage to the vertical conductor of the LED matrix 59 for the correct sort location. The horizontal decoder 66 is addressed by signals on the address lines 68 from the film reading photocells 46 and is enabled by the lead 63 going low, indicating an error sort, to cause the output lead from the decoder 66 for the correct horizontal conductor of the matrix 59 to go low, and this is inverted by one of the inverters 66-I, for example, Texas Instruments 7404 inverters, to cause the horizontal conductor of the LED matrix 59 for the proper sort position to go high, thus activating the LED indicator 25 cross-connecting the appropriate horizontal and vertical conductors of the LED matrix 59 to illuminate the LED indicator 25 for the correct sort location.

Figure 7:
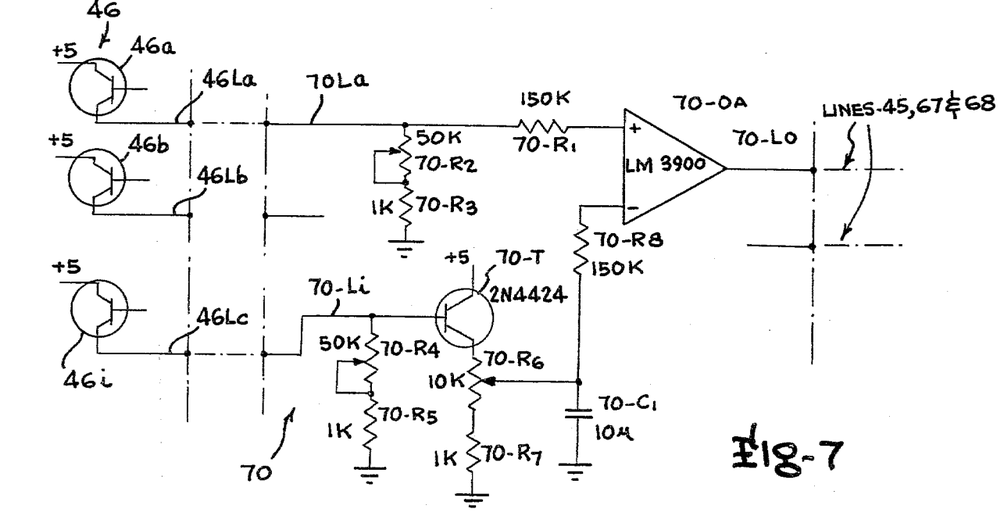
FIG. 7 is a schematic diagram indicating the circuitry employed between certain of the light sensing photocells of the audio-visual projector sensing light code marginal identifications on the training film to provide appropriate signals to apply to address lines leading to the circuitry associated with the console.

FIG. 7 illustrates in schematic diagram form the circuit for the photocell interface board or panel, indicated generally by the reference character 70, for processing the output signals from the film reading photocells 46 for application to the address lines 45, 67 and 68 to the multiplexers 42 and 44 and to the decoders 65 and 66. The film reading photocells, indicated generally by the reference character 46, are incorporated in the audio-visual projector 35 and arranged, in the described preferred embodiment, as a vertical bank of 9 photocells, only 3 of which are illustrated in FIG. 7 as photocells 46a, 46b and 46i, positioned in the audio-visual projector at a location to receive light from the light bar code material on the margin of the film in the cassette or cartridge positioned in the projector section 35a, as for example by providing stationary mirrors or prisms in the projector to direct light from the marginal light bar pattern on the film onto the vertically arranged bank of photocells 46. The bank of photocells in the described embodiment consists of 8 data sensor phototransistors for sensing the coded light bar patterns on the margin of the film indicating the proper sort position for the associated film frame, and a 9th phototransitor, which is designated the reference sensor and indicated at 46i, which is positioned, in the example, in the middle of the column and always has light directed onto it by providing an always-transparent light bar on the film margin at a position to be directed onto reference photocell 46i. The phototransistor 46a to 46i may be GS 631 phototransistors, having their collectors connected to a source of +5 volts DC and their emitters connected to 9 output leads, respectively, some of which are indicated at 46-La, 46-Lb and 46-Li for connection by a cable from the projector 35 to the sortation console unit 10 to connect to 9 input leads such as leads 70-La and 70-Li of the photocell interface board 70. Each of the input leads, such as 70-La, for the 8 light bar code data sensor photocells 46a–46h form inputs for 8 separate signal processing channels which are identical, and for which, therefore, only the channel for data sensor photocell 46a will be described. The input lead 70-La is connected through resistor 70-R1 to the positive input of a comparator Operational Amplifier 70-OA, which may be an LM3900, and a resistor network consisting of 50K potentiometer 70-R2 and 1K resistor 70-R3 is connected between the input lead 70-La and ground. The negative input of the comparator operational Amplifier 70-OA is connected to a reference voltage forming circuit receiving signals from the reference photocell 46i.

The signals from the photocell 46i are applied to the reference circuit input lead 70-Li connected to the base of transistor 70-T which may be a 2N4424 transistor having its collector connected to +5 volts DC. The lead 70-Li also connects through 50K potentiometer 70-R4 and 1K potentiometer 70-R5 to ground, and the emitter of the transistor 70-T is connected through 10K threshold adjust potentiometer 70-R6 and 1K resistor 70-R7 to ground. The movable contact of the threshold adjust potentiometer 70-R6 has a 10 μf capacitor 70-C1 connected between the movable contact and ground and connects through 150K resistor 70-R8 to the negative contact of the comparator Operational Amplifier 70-OA. The output lead 70-LO from the Operational Amplifier 70-OA leads to a socket terminal for connection to a plural conductor plug and forms one of the address lines for supplying the address signals to the multiplexers and decoders. The output leads from the other 7 signal processing channels for the data sensor photocells 46b to 46h form the outputs for connection to the other 7 address lines. The adjustable potentiometers, such as 70-R2 and 70-R4, in the input circuits to the Operational Amplifiers and the reference transistor 70-T in the 9 channels, permit adjustment initially and at other desired intervals to make up for variations in the properties or characteristics of the sensor photocells 46a–46i. The transistor 70-T is an emitter-follower to beef up the signal received from the reference sensor photocell 46i, to provide a reference voltage, for example at about +2 volts, on the negative input of the Operational Amplifiers for the data sensor channels. In the illustrated example, the voltage applied to the positive inputs of the 8 Operational Amplifiers for the data channels is about +4 volts for a light bar on the margin of the film and about $+\frac{3}{4}$ volts for a dark bar on the film margin, causing the output on the lead 70-LO to be at about +5 volts for a light bar and about 0 volts for a dark bar.

It will be understood that in the learning mode of the apparatus, the trainee, when the trainee touches one of the squares on the front panel of the sortation console unit, activates one of the touch switches 27, producing a signal which is processed by the interface 43 and horizontal multiplexer 44 to provide a logic 1 signal to the OR gate network 53, providing a signal indicating that a touch switch 27 has been activated, whether or not it is in the correct location. If the correct switch 27 was activated, as determined by the signals on the address leads to the horizontal and vertical multiplexers 44 and 42 and the horizontal and vertical matrix conductors of the switch matrix 40 cross-connected by the closed touch switch, NAND gate 49 is activated to provide a logic 1 output to the correct/error detector 51 indicating that the correct touch switch 27 was activated. This causes the correct/error detector 51 to provide an output on the lead 55 and 56 to cause the film advance relay control 57 to advance the film to the next frame and also through the coupling network 58 causes the correct counter 17 to be advanced one count. If an incorrectly located touch switch 27 was activated, the NAND gate 49 output goes high, activating the correct/error detector 51 to cause the error counter 18 to be advanced one count, and activating the flip-flop 62 to provide a low enable signal to the decoders 65 and 66 to cause the correct LED 25 to be illuminated, thus advising the trainee of the correct sort location for that film frame.

On the test mode, the training/test mode switch 21 disconnects the film advance relay control 57 from the output of the correct/error detector and instead connects the film advance control to the pin 6 output of the 50 millisecond one-shot multivibrator 51-M3 to cause the film frame to be advanced each time the output from the OR gate network 53 indicates that a touch switch 27 has been activated, whether or not it is at the correct sort location.

We claim:

1. Scheme and knowledge trainer apparatus for teaching trainees sortation scheme and knowledge items and skills as required in mail sorting and the like, comprising an electronic sortation training console having a substantially vertical, rectangular sort block display and touch switch panel depicting plural horizontal rows and vertical columns of sort blocks symbolizing discrete sort locations and having an associated touch sensing switch within each sort block, each of said sort blocks including a transparent rectangular window through which legends can be viewed and a touch target symbol overlying the associated touch sensing switch within the block and adjacent said window, changeable indicia carriers for displaying through the windows of the sort blocks legends denoting sort location titles therefore, a visual projector to be located within view of the trainee having a viewing screen and means receiving a training film having frames for successively displaying lesson information on the screen depicting sort location legends correlated with the legends displayed through the windows at said blocks and having sensor activating code means denoting the correct console sort block location for the displayed legends, sensor means for producing correct location signals responsive to said code means, electronic circuit means coupled to said switches and said correct location signals including correct/error detector means for sensing the sort location on said panel of each touch sensing switch activated by the trainee and sensing the sort location signified by said correct location signals, and correct and incorrect readout counters activated by said detector means to indicate the number of correct and incorrect touch sensing switch activations.

2. Trainer apparatus as defined in claim 1, wherein said electronic circuit means includes means for producing a visible wrning signal at the correct sort location on the panel responsive to activation of a touch sensing switch at an incorrect sort location.

3. Training apparatus as defined in claim 1, wherein said panel includes a light emitter at each sort block, and said electronic circuit means include means responsive to said correct location signals and to each activation of said touch sensing switches to activate the light emitter at the correct sort locations when a touch sensing switch at an incorrect location is activated.

4. Training apparatus as defined in claim 3, wherein said apparatus includes a mode switch for placing the apparatus in a training mode enabling said light emitter to be activated upon each activation of one of said touch sensing switches at an incorrect sort location and for conditioning the apparatus in a test mode disabling the means for activating the light emitter at correct sort locations when incorrectly positioned touch sensing switches are activated.

5. Training apparatus as defined in claim 3, wherein said electronic circuit means includes a film frame advancing circuit activated by each correct count signal produced by said detector means for automatically advancing the training film in the projector to the next frame only upon activation of the touch sensing switch for the correct sort location legend being displayed on the screen.

6. Trainer apparatus as defined in claim 3, wherein said electronic circuit means includes a switch matrix intercoupled with said touch sensing switches for producing matrix coordinate signals indicating the location coordinates of the activated tough sensing switch, multiplexer means addressed by said correct location signals and gate means connected thereto for producing a correct input signal to said detector means when the touch sensing switch for the sort location signified by the correct location signals for an associated film frame is activated, further gate means coupled to said switch matrix to produce a count input signal to the detector means for each activation of one of the touch sensing switches regardless of whether the switch was in the sort location signified by the associated correct location signals, and said detector means having means responsive to said correct input signals and count input signals for producing a correct count output signal and an error count output signal for said readout counters continuously monitoring correct and incorrect activation of the touch sensing switches.

7. Training apparatus as defined in claim 1, wherein said panel includes a light emitter at each sort block, and said electronic circuit means includes means producing a count signal for each activation of any of the touch sensing switches and means responsive to each count signal and to an error signal from said detector means indicating activation of an incorrect touch sensing switch to activate the light emitter at the correct sort location.

8. Training apparatus as defined in claim 7, wherein said apparatus includes a mode switch for placing the apparatus in a training mode enabling said light emitter to be activated upon each activation of one of said touch sensing switches at an incorrect sort location and for conditioning the apparatus in a test mode disabling the means for activating the light emitter at correct sort locations when incorrectly positioned touch sensing switches are activated.

9. Training apparatus as defined in claim 8, wherein said electronic circuit means includes a film frame advancing circuit activated by each correct count signal produced by said detector means for automatically advancing the training film in the projector to the next frame only upon activation of the touch sensing switch for the correct sort location legend being displayed on the screen when said mode switch is in training position, and circuit means operative when the mode switch is in test position for causing the training film to be advanced one frame for each activation of one of the touch sensing switches regardless of whether it is at a correct or incorrect sort location.

10. Training apparatus as defined in claim 7, wherein said electronic circuit means includes a film frame advancing circuit activated by each correct count signal produced by said detector means for automatically advancing the training film in the projector to the next frame only upon activation of the touch sensing switch for the correct sort location legend being displayed on the screen.

11. Trainer apparatus as defined in claim 10, wherein the panel includes at each respective column of sort blocks a top opening vertically elongated strip receiving slot immediately behind the windows of the associated column spanning the height of the column, each of said slots removably receiving an elongated indicia carrier strip bearing said legends to be located behind and visible through the windows of the associated row.

12. Trainer apparatus as defined in claim 10, wherein said electronic circuit means includes a switch matrix intercoupled with said touch sensing switches for producing matrix coordinate signals indicating the location coordinates of the activated touch sensing switch, multiplexer means addressed by said correct location signals and gate means connected thereto for producing a correct input signal to said detector means when the touch sensing switch for the sort location signified by the correct location signals for an associated film frame is activated, further gate means coupled to said switch matrix to produce a count input signal to the detector means for each activation of one of the touch sensing switches regardless of whether the switch was in the sort location signified by the associated correct location signals, and said detector means having means responsive to said correct input signals and count input signals for producing a correct count output signal and an error count output signal for said readout counters continuously monitoring correct and incorrect activation of the touch sensing switches.

13. Trainer apparatus as defined in claim 12, including a light emitter matrix intercoupled with said light emitters at the sort blocks of said panel having decoder means coupled with said matrix for selectively activating the individual light emitters, and means coupled to said decoder means to be activated by error count output signals from the detector means for activating the light emitter at the correct sort location to visually identify the correct sort location to the trainee, the film frame advancing means being operative to advance to the next frame only upon activation of the correct touch sensing switch in a training mode of the apparatus.

14. Trainer apparatus as defined in claim 7, wherein the panel includes at each respective column of sort blocks a top opening vertically elongated strip receiving slot immediately behind the windows of the associated column spanning the height of the column, each of said slots removably receiving an elongated indicia carrier strip bearing said legends to be located behind and visible through the windows of the associated row.

15. Training apparatus as defined in claim 1, wherein said electronic circuit means includes a film frame advancing circuit activated by each correct count signal produced by said detector means for automatically advancing the training film in the projector to the next frame only upon activation of the touch sensing switch for the correct sort location legend being displayed on the screen.

16. Trainer apparatus as defined in claim 15, wherein said electronic circuit means includes a switch matrix intercoupled with said touch sensing switches for producing matrix coordinate signals indicating the location coordinates of the activated touch sensing switch, multiplexer means addressed by said correct location signals and gate means connected thereto for producing a correct input signal to said detector means when the touch sensing switch for the sort location signified by the correct location signals for an associated film frame is activated, further gate means coupled to said switch matrix to produce a count input signal to the detector means for each activation of one of the touch sensing switches regardless of whether the switch was in the sort location signified by the associated correct location signals, and said detector means having means responsive to said correct input signals and count input signals for producing a correct count output signal and an error output signal for said readout counters continuously monitoring correct and incorrect activation of the touch sensing switches.

17. Trainer apparatus as defined in claim 16, including a light emitter matrix intercoupled with said light emitters at the sort blocks of said panel having decoder means coupled with said matrix for selectively activating the individual light emitters, and means coupled to said decoder means to be activated by error count output signals from the detector means for activating the light emitter at the correct sort location to visually identify the correct sort location to the trainee, the film frame advancing means being operative to advance to the next frame only upon activation of the correct touch sensing switch in a training mode of the apparatus.

18. Trainer apparatus as defined in claim 1, wherein the panel includes at each respective column of sort blocks a top opening vertically elongated strip receiving slot immediately behind the windows of the associated column spanning the height of the column, each of said slots removably receiving an elongated indicia carrier strip bearing said legends to be located behind and visible through the windows of the associated row.

19. Trainer apparatus as defined in claim 1, wherein said electronic circuit means includes a switch matrix intercoupled with said touch sensing switches for producing matrix coordinate signals indicating the location coordinates of the activated touch sensing switch, multiplexer means addressed by said correct location signals and gate means connected thereto for producing a correct input signal to said detector means when the touch sensing switch for the sort location signified by the correct location signals for an associated film frame is activated, further gate means coupled to said switch matrix to produce a count input signal to the detector means for each activation of one of the touch sensing switches regardless of whether the switch was in the sort location signified by the associated correct location signals, and said detector means having means responsive to said correct input signals and count input signals for producing a correct count output signal and an error count output signal for said readout counters continuously monitoring correct and incorrect activation of the touch sensing switches.

20. Trainer apparatus as defined in claim 19, including a light emitter matrix intercoupled with said light emitters at the sort blocks of said panel having decoder means coupled with said matrix for selectively activating the individual light emitters, and means coupled to said decoder means to be activated by error count output signals from the detector means for activating the light emitter at the correct sort location to visually identify the correct sort location to the trainee.

* * * * *